United States Patent [19]

Arioka

[11] Patent Number: 5,616,447
[45] Date of Patent: Apr. 1, 1997

[54] OPTICAL DISC HAVING PRINTABLE LABEL LAYER

[75] Inventor: Hiroyuki Arioka, Nagano, Japan

[73] Assignee: TDK Corporation, Tokyo, Japan

[21] Appl. No.: 511,440

[22] Filed: Aug. 4, 1995

[30] Foreign Application Priority Data

Sep. 8, 1994 [JP] Japan .................................... 6-240625

[51] Int. Cl.$^6$ .................................................. G11B 7/24
[52] U.S. Cl. ...................... 430/270.11; 430/945; 428/64.4
[58] Field of Search ........................... 369/284; 428/64.4; 347/2, 105; 430/945, 270.11

[56] References Cited

U.S. PATENT DOCUMENTS 5,526,031  6/1996  Kurabayashi .......................... 347/105

FOREIGN PATENT DOCUMENTS

| 0574860 | 12/1993 | European Pat. Off. . |
| 61-032788 | 2/1986 | Japan . |
| 61-041585 | 2/1986 | Japan . |
| 61-063474 | 4/1986 | Japan . |
| 63-65036 | 12/1988 | Japan . |
| 6-060432 | 3/1994 | Japan . |

OTHER PUBLICATIONS

Odian, "Principles of Polymerization" pp. 20–25 (1981).

*Primary Examiner*—John A. McPherson
*Attorney, Agent, or Firm*—Watson Cole Stevens Davis, PLLC

[57] ABSTRACT

In an optical disc, a first cover layer comprising a filler and a binder is formed on a protective coat, and a second cover layer of at least 0.1 μm thick comprising at least 80% by weight of vinyl pyrrolidone polymer having $Mw \geq 30{,}000$ is formed on the first cover layer. The second cover layer is printable with water-based ink. There is obtained an optical disc having a label surface which is printable with water-based ink to form characters and images which are erasable for correction.

9 Claims, 1 Drawing Sheet

OPTICAL DISC HAVING PRINTABLE LABEL LAYER

BACKGROUND OF THE INVENTION

1. Technical Field

This invention relates to an optical disc whose label surface is printable or writable with a water-based ink pen or an ink jet printer and a printable material.

2. Background Art

It is sometimes desired to write or print personal memorandums on a label surface of optical discs as typified by write-once compact discs (CD-R). In general, such optical discs have a protective coat formed of a radiation-cured resin which is repellent to water-based ink. It is then impossible to write or print characters on the protective coat surface with a water-based ink pen or ink jet printer.

It is then a common practice to print with oil-based ink or to attach a label to the disc on which characters are printed. The printing with oil-based ink must be manual writing. The attachment of a label can adversely affect not only the outer appearance, but also subsequent recording and readout operation.

Japanese Patent Application Kokai (JP-A) No. 60432/1994 discloses an optical information medium (compact disc) wherein a hydrophilic resin film is formed on a protective coat surface to provide a hydrophilic surface capable of fixing aqueous printing ink. It is described that the film surface ensures effective printing of characters and solid marks when printed by means of an ink jet printer.

Also Japanese Patent Publication (JP-B) No. 65036/1988 discloses a printable material for ink jet printing comprising a coating layer containing a particulate filler and a binder. The filler particles have a mean particle size of 3 to 25 μm and exposed at the coating layer surface in a distribution of 10,000 to 100,000 particles per square millimeters. JP-A 41585/1986 discloses a printable material for ink jet printing comprising an ink receptive layer consisting of polyvinyl pyrrolidone (PVP) and polyvinyl alcohol (PVA) in a weight ratio of from 1:3 to 5:1. JP-A 63474/1986 discloses a printable material for ink jet printing comprising an ink receptive layer consisting of a copolymer of vinyl pyrrolidone and vinyl acetate. Allegedly these printable materials are printable with clear images.

It is sometimes desired to rewrite the printed characters (or marks) where the contents have been wrong due to misunderstanding or miswriting or for some other reasons. It is convenient if the printed characters can be erased or corrected. However, since conventional water-based ink receptive coatings were developed to improve fixation of printed characters, it was impossible to erase or correct the once printed characters.

SUMMARY OF THE INVENTION

Therefore, a primary object of the present invention is to provide an optical disc having on its label surface a cover layer which is printable with water-based ink to afford characters or images of high quality and definition while the once printed characters or images are erasable or correctable.

Another object of the present invention is to provide a printable material having such a cover layer.

In a first aspect, the present invention provides an optical disc comprising an optical disc body and a protective coat thereon. A first cover layer comprising a filler and a binder is disposed on the protective coat. A second cover layer comprising at least 80% by weight of vinyl pyrrolidone polymer having a weight average molecular weight Mw of at least 30,000 is disposed on the first cover layer. The second cover layer has a thickness of at least 0.1 μm, preferably 0.2 to 20 μm and is printable with water-based ink.

In one preferred embodiment, the first cover layer has a surface roughness R20 of 1.0 to 5.0 μm. In another preferred embodiment, the first cover layer has a thickness of 3 to 20 μm; the filler is particulate and has a mean particle size of 0.1 to 50 μm; the filler is an inorganic fine particulate filler, typically silica, alumina or barium salt; the binder is a radiation-curable compound which has been cured by UV exposure. Preferably the protective coat is formed of a radiation-cured resin and includes two or more layers.

Also contemplated herein is a printable material comprising a first layer comprising a filler and a binder, and a second layer on the first layer comprising at least 80% by weight of vinyl pyrrolidone polymer having a weight average molecular weight Mw of at least 30,000, the second layer having a thickness of at least 0.1 μm and being printable with water-based ink.

FUNCTION AND ADVANTAGE

According to the present invention, a first cover layer comprising a filler and a binder is formed on the label surface of an optical disc, and a second cover layer comprising at least 80% by weight of a vinyl pyrrolidone polymer, typically pollvinyl pyrrolidone (PVP), having a weight average molecular weight Mw of at least 30,000 is formed on the first cover layer to a thickness of at least 0.1 μm. The presence of the dual cover layers enables formation of characters and images by printing with water-based ink using a water-based ink pen or ink jet printer. The images (inclusive of characters) printed with water-based ink are clear, definite and free of blur, blot or repellence. While water in the water-based ink penetrates into the first cover layer, the dye component in the ink stays on the surface of the second cover layer. Then the printed characters or images can be erased by splashing water or wiping with wet fabric. Any character or image which is unacceptable due to miswriting or blotting can be erased and corrected.

Since the protective coat of the optical disk is generally formed of a radiation-cured resin, use of a radiation-curable compound as the binder of the first cover layer improves the adhesion of the first cover layer to the protective coat.

Since the surface of the first cover layer is not flat or smooth due to the inclusion of the filler, the surface of the second cover layer is not flat or smooth. The irregular surface of the second cover layer is effective for preventing blotting or repellence of printed characters or images. The irregular surface of the first cover layer provides an anchoring effect to provide a firm joint to the second cover layer. The first cover layer provides film strength and moisture resistance which are not achievable with the second cover layer alone.

BRIEF DESCRIPTION OF THE DRAWINGS

The only figure.

BEST MODE FOR CARRYING OUT THE INVENTION

Figure 1:
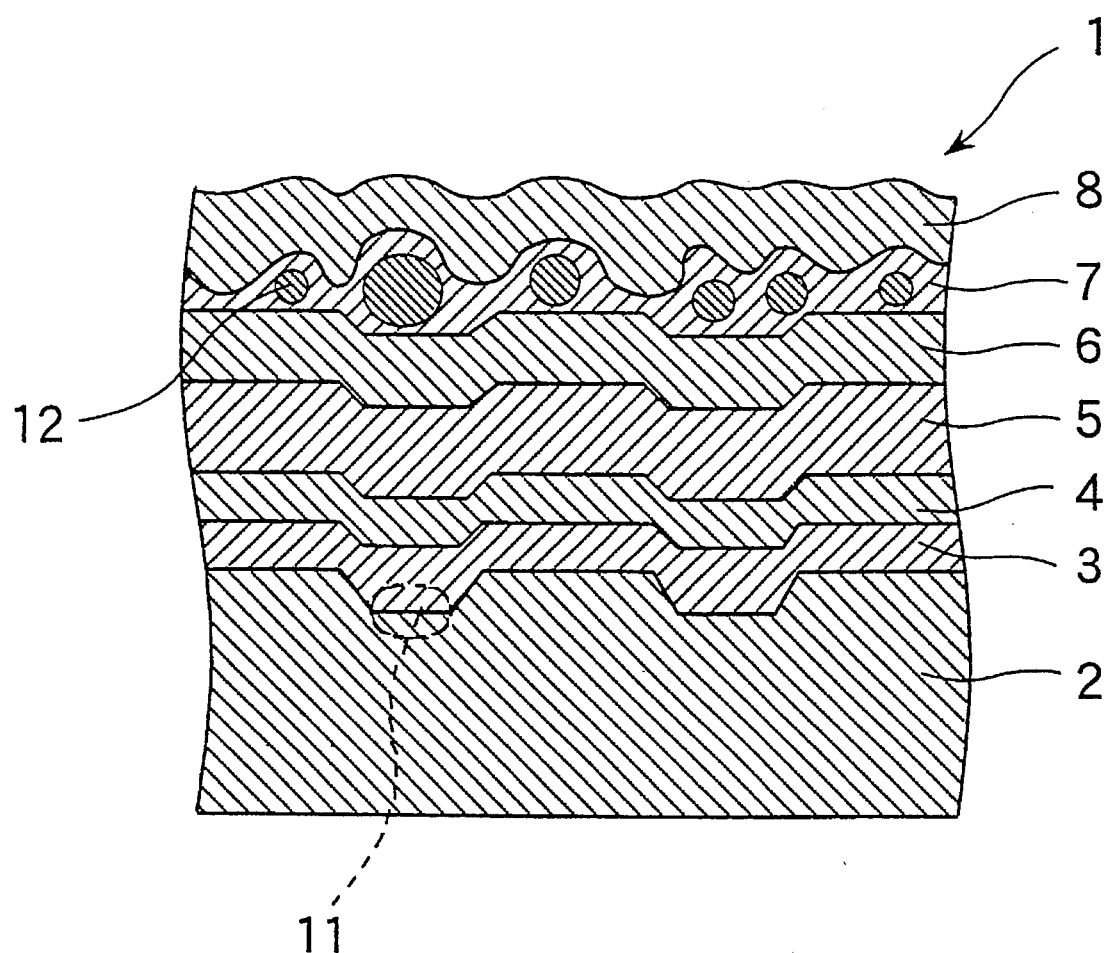
FIG. 1 is a schematic cross-sectional view of a portion of an optical disc according to the present invention.

The optical disc of the present invention is a write-once compact disc (CD-R). The disc includes a first cover layer comprising a filler and a binder on a protective coat, that is, a label surface and a second cover layer comprising vinyl pyrrolidone polymer on the first cover layer, enabling printing with water-based ink.

The vinyl pyrrolidone polymer of which the second cover layer is primarily constructed has a weight average molecular weight Mw of at least 30,000, preferably 35,000 to 1,000,000. A weight average molecular weight within this range ensures printing of satisfactory characters and images. With Mw of less than 30,000, printability lowers resulting in blurring and blotting of printed characters. Although this phenomenon occurs with all images printed with water-based ink as well as printed characters, reference is mainly made to printed characters in this disclosure. The printed characters encompass mechanically printed characters and manuscript characters although the former is most often meant.

The vinyl pyrrolidone polymer has a degree of polymerization (n) of about 360 to 90,000. The vinyl pyrrolidone polymer is preferably a homopolymer resulting from polymerization of vinyl pyrrolidone monomers alone, that is, polyvinyl pyrrolidone (PVP) although it may be a copolymer containing less than 10% by weight of another monomer component, for example, vinyl acetate, ethylene, ethylene oxide, carbonate ester and vinyl chloride.

The second cover layer contains at least 80% by weight, preferably 85 to 100% by weight of the vinyl pyrrolidone polymer. A vinyl pyrrolidone polymer content within this range enables printing of satisfactory characters and erasing thereof. Problems arise with a vinyl pyrrolidone polymer content of less than 80% by weight. For example, if the majority (more than 50% by weight) of the material used in combination with the vinyl pyrrolidone polymer to form the layer is a hydrophilic material, erasing of printed characters is impossible, and if the same majority is a hydrophobic material, erasing of printed characters is impossible and printed characters are blurred.

No particular limit is imposed on the material which can be used in combination with the vinyl pyrrolidone polymer to form the second cover layer. It may be either a hydrophilic or a hydrophobic material. Polymers are often used. Examples of hydrophilic polymer include water-soluble nylon (e.g., AQ Nylon A-70 commercially available from Toray K.K.), polyvinyl alcohol, polyacrylamide, polyacrylic acid, polyethylene oxide, partially saponified polyvinyl acetate, gelatin and starch; and examples of hydrophobic polymer include polyamides, polyimides, polyurethanes, polyesters, polyethylene, polyvinyl chloride and polystyrene.

The second cover layer may additionally contain a filler as will be described later in conjunction with the first cover layer.

The second cover layer has a thickness of at least 0.1 μm, preferably 0.2 to 20 μm. A thickness in this range ensures satisfactory printability. A second cover layer with a thickness of less than 0.1 μm is low in printability, resulting in blurred and blotted characters. No further improvements are expected with a thickness beyond necessity.

The first cover layer preferably has a surface roughness R20 of at least 1.0 μm, more preferably 1.0 to 5.0 μm. It is noted that the surface of the first cover layer is the upper surface, that is, the surface remote from the disc body (recording layer and substrate). In conformity with the first or underlying cover layer having such a surface roughness, the second or overlying cover layer has an adequate surface roughness to prevent printed characters from blotting or being repelled which would occur if the second cover layer has a flat smooth surface, ensuring satisfactory printability. The above-defined surface roughness of the first cover layer is also effective for improving the adhesion between the first and second cover layers.

The first cover layer preferably has a thickness of at least 3 μm, more preferably 3 to 20 μm. This range of thickness is effective for establishing a surface roughness in the above-defined range.

The term surface roughness R20 used herein is a twenty-point mean surface roughness. The twenty-point mean surface roughness R20 has the same definitions and designation as the ten-point mean surface roughness R10 by JIS B 0601-1982 with the exception of increasing the number of measurement points from ten to twenty. The terms, surface roughness, profile, reference length of profile, roughness curve, cut-off value, mean line of profile, and profile peak and valley are as defined in the standard.

The twenty-point mean roughness shall be the value of difference, being expressed in micrometer (μm), between the mean value of altitudes of peaks from the highest to the 10th, measured in the direction of vertical magnification from a straight line that is parallel to the mean line and that does not intersect the profile, and the mean value of altitudes of valleys from the deepest to the 10th, within a sampled portion, of which length corresponds to the reference length, from the profile. The profile may be depicted by means of a probe meter, for example.

The twenty-point mean roughness R20 is given by the following equation:

$$R20=[(R^1+R^2+R^3+R^4+R^5+R^6+R^7+R^8+R^9+R^{10})-(R^{11}+R^{12}+R^{13}+R^{14}+R^{15}+R^{16}+R^{17}+R^{18}+R^{19}+R^{20})]/10$$

wherein $R^1$ to $R^{10}$ are altitudes of peaks from the highest to the 10th for the sampled portion corresponding to the reference length L, and $R^{11}$ to $R^{20}$ are altitudes of valleys from the deepest to the 10th for the samples portion corresponding to the reference length L. The reference length L varies with the range of the twenty-point mean roughness R20 and it is also in conformity to the standard. For example, L=0.25 mm when R20≦0.8 μm, L=0.8 mm when 0.8 μm<R20≦6.3 μm, L=2.5 mm when 6.3 μm<R20≦25 μm, and so on.

The probe-type surface roughness meter used herein is Talystep-1 manufactured by Taylor Hobson Company. The probe having a tip size of 0.1×2.5 μm was operated under a load of 2 mg with a cut-off value of the order of 0.18 to 9 Hz at a probe speed of 30 μm/sec.

The filler used in the first cover layer is not critical. Either inorganic or organic fine particles may be used. Exemplary fillers are silica, silica gel, barium salts such as barium sulfate and barium carbonate, clay, talc, diatomaceous earth, calcium carbonate, calcium sulfate, aluminum silicate, zeolite, alumina, zirconia, magnesia, boron nitride, titanium nitride, protein particles, and resin particles. Inorganic fine particles are preferred. More particularly, silica, silica gel, alumina, barium sulfate, and barium carbonate are preferred, with the silica, alumina and barium sulfate being most preferred. The fillers may be used alone or in admixture of two or more.

No particular limit is imposed on the shape of the filler. The filler particles may be either granular or spherical. Their mean particle size is preferably 0.1 to 30 μm, more preferably 0.5 to 20 μm as measured under a scanning electron microscope (SEM). For particles other than spherical, the mean particle size is determined by calculating the diameter of circles equivalent to the projected areas.

The filler is contained in the first cover layer in such an amount as to provide a surface roughness in the above-defined range, often about 1 to 30% by weight.

In conformity with the first cover layer, the second cover layer preferably presents a surface roughness R20 of about 1 to 5 μm.

The binder used in the first cover layer is not critical insofar as it can provide a firm joint between the protective coat of the optical disc and the second cover layer.

Since the protective coat of the optical disk is generally formed of a radiation-cured resin, a radiation-curable compound is preferably used as the binder of the first cover layer. Of course, the radiation-curable compound is present in cured state in the layer.

The radiation-curable compounds include monomers, oligomers and polymers having contained or introduced in their molecule a group capable of crosslinking or polymerization upon exposure to radiation, for example, such as an acrylic double bond as in acrylic acid, methacrylic acid or esters thereof having an unsaturated double bond which is sensitive to ionization energy and radical polymerizable, an allyl double bond as in diallyl phthalate, and an unsaturated double bond as in maleic acid and maleic acid derivatives. They may be used alone or in admixture.

The preferred radiation-curable monomers are compounds having a molecular weight of less than 2,000 and preferred oligomers are those having a molecular weight of 2,000 to 10,000. Examples include styrene, ethyl acrylate, ethylene glycol diacrylate, ethylene glycol dimethacrylate, diethylene glycol diacrylate, diethylene glycol methacrylate, 1,6-hexane glycol diacrylate, and 1,6-hexane glycol dimethacrylate. Especially preferred are pentaerythritol tetraacrylate (or methacrylate), pentaerythritol acrylate (or methacrylate), dipentaerythritol hexaacrylate (or methacrylate), trimethylolpropane triacrylate (or methacrylate), trimethylolpropane diacrylate (or methacrylate), acryl-modified products of urethane elastomers, those compounds having a functional group such as COOH introduced therein, acrylates (or methacrylates) of phenol ethylene oxide adducts, compounds wherein an acryl (or methacryl) group or ε-caprolactone-acryl group is attached to a pentaerythritol condensed ring as disclosed in Japanese Patent Application No. 072888/1987, and acryl group-bearing monomers and/or oligomers such as special acrylates as disclosed in Japanese Patent Application No. 072888/1987. Other useful radiation-curable oligomers include acryl modified products of urethane elastomers, and those products having a functional group such as COOH introduced therein.

In addition to or instead of the above-mentioned compounds, radiation-curable compounds obtained by modifying thermoplastic resins to be sensitive to radiation may also be used. Examples of such radiation-curable resins include thermoplastic resins having contained or introduced in their molecule a group capable of crosslinking or polymerization upon exposure to radiation, for example, such as an acrylic double bond as in acrylic acid, methacrylic acid or esters. thereof having an unsaturated double bond which is radical polymerizable, an allyl double bond as in diallyl phthalate, and an unsaturated bond as in maleic acid and maleic acid derivatives. Examples of the thermoplastic resin which can be modified into a radiation-curable resin include vinyl chloride copolymers, saturated polyester resins, polyvinyl alcohol resins, epoxy resins, phenoxy resins, and cellulose derivatives. Other resins which can be modified to be radiation-sensitive include polyfunctional polyester resins, polyether ester resins, polyvinyl pyrrolidone resins and derivatives (PVP olefin copolymers), polyamide resins, polyimide resins, phenol resins, spiro-acetal resins, and acrylic resins containing at least one acrylate or methacrylate having a hydroxyl group as a polymerizable component.

Such radiation-curable compounds are cured with radiation. More particularly, a first cover layer of such compound is coated and then exposed to radiation such as ultraviolet radiation and electron radiation, preferably UV.

The content of the binder in the first cover layer is preferably 99 to 30% by weight, more preferably 98 to 50% by weight. The binder content within this range optimizes the content of the filler to provide the first cover layer with appropriate film strength and moisture resistance.

In the practice of the invention, photo-polymerization initiators are preferably contained in the radiation-curable compounds, particularly when they are cured by exposure to UV radiation. The photo-polymerization initiators used herein are not critical and include benzoic acid esters, benzophenone derivatives, benzoin derivatives, thioxanthane derivatives, acetophenone derivatives, propiophenone derivatives, and benzyl. Examples of the polymerization initiator include methyl-ortho-benzoyl benzoate, benzophenone, 4,4-bisdiethylaminobenzophenone, dibenzosuberone, benzoyl alkyl ethers ($R=C_{1-8}$ alkyl group which may be branched), 1-phenyl-1,2-propanedion-2-(o-ethoxycarbonyl)oxime, 1-phenyl-1,2-propanedion-2-(o-benzoyl)oxime, 2,2-dimethoxy-2-phenylacetophenone, 2,2-diethoxyacetophenone, chlorinated acetophenone derivatives, 4-isopropyl-2-hydroxy-2-methylpropiophenone, 2-hydroxy-2-methylpropiophenone, 2-hydroxy-2-methyl-1-phenylpropan-1-one, and benzyl. Preferred among these are 2-hydroxy-2-methyl-1-phenylpropan-1-one, 2,2-dimethoxy-2-phenylacetophenone, and methyl-o-benzoyl benzoate. Among these preferred polymerization initiators, 2-hydroxy-2-methyl-1-phenylpropan-1-one is commercially available as Darocure 1173 from Merck & Co. Inc. and 2,2-dimethoxy-2-phenylacetophenone is commercially available as Irgacure 651 from Ciba Geigy. The polymerization initiator is preferably contained in an amount of 1 to 5% by weight of the radiation-curable compound in the first cover layer.

A combination of a radiation-curable compound with a polymerization initiator is commercially available and useful in the practice of the invention. For example, a mixture of a photo-reactive oligomer, a photo-reactive monomer and a photo-polymerization initiator is commercially available as optical disc top coat SD-211 from Dainippon Ink and Chemicals. Inc.

Another organic or inorganic material may be contained in the first cover layer.

In the practice of the invention, the first and second cover layers may be formed as follows.

The first cover layer is formed by blending proper amounts of a filler and a binder to prepare a coating liquid, applying the coating liquid onto the protective coat of an optical disc, and drying the coating. No solvent need be added to the coating liquid if the binder is liquid. If desired, suitable solvents such as alcohols, ketones, ethers and hydrocarbons may be used. The application technique may be any of well-known techniques, for example, spin coating, spray coating, dipping, gravure coating, knife coating, reverse roll coating, screen printing, and bar coating.

In the preferred embodiment wherein the coating of the first cover layer contains a radiation-curable compound, the coating is cured by exposing it to radiation. Where a solvent is used, the coating is dried to remove the solvent before curing. The radiation used herein is preferably UV as previously mentioned and it is irradiated at an intensity of at least about 50 mW/cm$^2$ and in a dose of about 200 to 2,000 mJ/cm$^2$. As the UV source, conventional light sources such as mercury lamps and metal halide lamps may be used.

After the first cover layer is formed in this way, the second cover layer is formed by preparing a coating liquid containing a predetermined amount of a vinyl pyrrolidone polymer and applying the coating liquid onto the first cover layer, followed by drying.

The coating liquid is prepared by blending the vinyl pyrrolidone polymer and another optional component (which is absent where a filler is used) with a proper amount of solvent. Any desired solvent may be used insofar as the vinyl pyrrolidone polymer and other component are soluble therein. For example, water, hydrophilic solvents such as alcohols and mixtures thereof are useful. The application technique is not critical and may be selected from conventional techniques as mentioned for the first cover layer. After the coating is formed, it is dried by heating at a temperature of about 40° to 90° C. for about ½ to 5 hours.

In the optical disc having the first and second cover layers borne thereon, the protective coat on which the first cover layer is formed is preferably of a multi-layer structure having two or more layers. Although the filler of some special shape in the first cover layer can adversely affect the recording/reading performance of the optical disc, the multi-layer structure of the protective coat can restrain such adverse influence.

Referring to FIG. 1, a write-once optical recording disc (CD-R) is illustrated as one exemplary structure of the optical disc of the present invention. The optical disc of FIG. 1 includes a protective coat of dual-layer structure and first and second cover layers thereon.

The optical disc 1 of FIG. 1 includes an optical disc body having a substrate 2, a recording layer 3 composed mainly of a dye on the substrate 2, and a reflective layer 4 in close contact with the recording layer 3. The disc 1 further includes a lower protective coat 5 on the disc body, an upper protective coat 6 on the lower protective coat 5, a first cover layer 7 on the upper protective coat 6, and a second cover layer 8 on the first cover layer 7. It is seen that filler particles 12 are distributed in the first cover layer 7.

The substrate 2 is formed of a resin or glass material which is substantially transparent (preferably a transmittance of at least 88%) to recording and reading light, typically a semiconductor laser beam having a wavelength of about 600 to 900 nm, especially about 770 to 900 nm, most often 780 nm. Then recording and reading operation can be made from the rear surface of the substrate.

Preferably, resins are used as the substrate material, with preferred examples including thermoplastic resins such as polycarbonate resins, acrylic resins, amorphous poly-olefins, and TPX. The substrate 2 may be prepared by conventional techniques such as injection molding. At this point, a predetermined pattern, typically a groove 11 is preferably formed in the substrate surface for tracking and addressing purposes. It is noted that after the substrate 2 is prepared, a resin layer having a predetermined pattern including grooves may be formed thereon by 2P (photo-polymerization) method or the like.

The recording layer 3 may contain only one dye or a mixture of compatible dyes. No particular limit is imposed on the light absorbing dye used in the recording layer 3 as long as it has maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more.

A quencher may be mixed with the light absorbing dye. Alternatively, an ionic combination or ionically bonded compound of a dye cation and a quencher anion is a useful light absorbing dye. Preferred quenchers used herein are metal complexes of acetylacetonates, bisdithiols such as bis(dithio-α-diketones) and bisphenyldithiols, thiocatechola, salicylaldehydeoximes, and thiobisphenolates. Also useful are amine quenchers such as amine compounds having a nitrogenous radical cation and hindered amines. For the ionically bonded dye combination, cyanine dyes having indolenine rings and metal complex quenchers such as bisphenyldithiol metal complexes are preferred.

The recording layer 3 is formed by spin coating, more particularly by dissolving the dye in a suitable organic solvent to form a coating solution and applying and spreading the coating solution on a rotating substrate. The organic solvent used in preparing a coating solution for the recording layer may be selected in accordance with a particular dye used from alcohols, ketones, esters, ethers, aromatics, and alkyl halides, with organic solvents having two or more functional groups in a molecule being preferred. The coating is dried after spin coating, if desired.

Preferably, the recording layer 3 thus formed has a thickness of about 1,000 to about 3,000 Å although the exact thickness depends on the reflectivity or the like.

On the recording layer 3, the reflective layer 4 is formed in direct close contact. The reflective layer 4 is formed of a high reflectivity material. Such preferred materials are Au, Cu, Ag, Al and alloys thereof. The reflective layer 4 may be formed by various vapor phase deposition techniques such as sputtering and evaporation. The reflective layer 4 preferably has a thickness of at least 500 Å. No upper limit is imposed on the thickness although it should preferably be up to about 1,700 Å from the standpoints of cost and operational time.

On the reflective layer 4 is formed the lower protective coat 5. The upper protective coat 6 is formed on the lower protective coat 5. It is preferred that both the lower and upper protective coats 5 and 6 be of radiation-cured resin. More preferably each coat is obtained by curing a coating of the above-mentioned radiation-curable compound with radiation. The coating and curing techniques are similar to those used for the first cover layer. The lower and upper protective coats 5 and 6 may be formed of the same or different resins and by the same or different coating techniques.

The lower protective coat 5 preferably has a thickness of 1 to 10 μm, more preferably 3 to 8 μm. The upper protective coat 6 preferably has a thickness of 2 to 20 μm, more preferably 5 to 15 μm. The lower and upper protective coats 5 and 6 preferably have a total thickness of 3 to 30 μm, more preferably 8 to 23 μm. A similar thickness of protective coat is applicable when the protective coat is a multi-layer structure of more than two layers. Preferably the thickness of each layer is 1 to 20 μm, more preferably 3 to 15 μm. Where the protective coat is a single layer, it is preferably 3 to 30 μm, more preferably 8 to 23 μm thick.

If the protective coat which is of either a single layer or multi-layer structure is too thin, it would be less effective for protection purpose with signals being often distorted upon recording. If the protective coat is too thick, such a thick coating would experience substantial shrinkage upon curing, causing warpage of the disc or cracking of the protective coat itself.

A multi-layer structure of two or more layers is effective for preventing a lowering of recording/reading characteristics, especially when each layer has a thickness within the above-defined range.

Preferably the upper protective coat 6 has a contact angle with water at 25° C. of at least 40°, more preferably 40° to 90°. The first cover layer 7 forms a firm joint to the upper protective coat 6 having such a contact angle with water, ensuring the effectiveness of the first and second cover layers 7 and 8.

The optical disc of the invention is not limited to the write-once optical recording disc having a recording layer in the form of a dye film in the illustrated embodiment. The invention is applicable to any optical disc insofar as information is read out or recording/reading operation is performed through an optical head. For example, read-only optical discs and erasable magneto-optical discs are included.

The optical disc having dual cover layers as defined above is writable or printable with water-based ink. For example, a water-based ink pen or ink jet recording system may be used. In the event of miswriting or blurring, the once printed characters may be erased and corrected. The water-based ink used herein is an ink containing a water-soluble dye, for example, C.I. Direct Black 19, C.I. Food Black, and Water Black 187L. Characters may also be printed with oil-based ink using an oil-based ink pen.

Although the optical disc has been described, the invention is also useful as a material to be written or printed.

EXAMPLE

Examples of the present invention are given below by way of illustration and not byway of limitation. All parts are by weight.

Example 1

Coating liquids of the following formulation for the first and second cover layers were prepared.

| | Parts |
|---|---|
| Coating liquid first cover layer | |
| $SiO_2$ (mean particle size 10 μm, spherical) | 10 |
| Photo-reactive oligomer (urethane acrylate, Aronix M-1100, Toa Synthetic Chemical K.K.) | 20 |
| Photo-reactive monomer (dipentaerythrithol hexaacrylate, Aronix M-400, Toa Synthetic Chemical K.K.) | 50 |
| Photo-polymerization initiator (2-hydroxy-2-methyl-1-phenylpropan-1-one, Darocure 1173, Merck & Co., Inc.) | 5 |
| $BaSO_4$ (mean particle size 5 μm, spherical) | 10 |
| $Al_2O_3$ (mean particle size 10 μm, spherical) | 5 |
| Coating liquid for second cover layer | |
| Polyvinyl pyrrolidone (Mw 40,000) | 90 |
| Water-soluble nylon (Toray AQ nylon A-70) | 10 |
| Isopropyl alcohol | 1000 |

There was furnished a write-once compact disc (CD-R) having an upper protective coat at the top. The coating liquid for the first cover layer was applied to the upper protective coat of the compact disc by screen printing and cured by exposure to UV to form the first cover layer having a dry thickness of 12 μm. For UV curing, a UV irradiating apparatus UVM-602 by Ushio Electric K.K. was used to provide a dose of 400 $mJ/cm^2$.

The coating liquid for the second cover layer was applied to the first cover layer and heated at 60° C. for 5 hours to form the second cover layer having a dry thickness of 5 μm.

In this way, a write-once compact disc (CD-R) sample No. 1 as shown in FIG. 1 was obtained.

Note that the starting CD-R had the upper protective coat of 10 μm thick and the lower protective coat of 6 μm thick, which had the following composition. The lower protective coat was obtained by forming a coating by spin coating and curing it with UV. The upper protective coat was obtained by forming a coating by screen printing and curing it with UV.

| | Parts |
|---|---|
| Upper protective coat composition | |
| Polyfunctional oligo-ester acrylate (Aronix M-8100, Toa Synthetic Chemical K.K.) | 97 |
| 2-hydroxy-2-methyl-1-phenylpropan-1-one (Darocure 1173, Merck & Co., Inc.) | 3 |
| Lower protective coat composition | |
| Polyfunctional oligo-ester acrylate (Aronix M-8100, Toa Synthetic Chemical K.K.) | 70 |
| Lauryl acrylate (Yushi L-A, Kyoei K.K.) | 27 |
| 2-hydroxy-2-methyl-1-phenylpropan-1-one (Darocure 1173, Merck & Co., Inc.) | 3 |

Sample No. 2 was prepared by the same procedure as sample No. 1 except that the second cover layer was omitted. That is, only the first cover layer was applied to a thickness of 15 μm. Sample No. 3 wherein only the second cover layer was applied to a thickness of 5 μm was similarly prepared. There were similarly prepared sample No. 4 wherein no filler was added to the first cover layer; sample. No. 5 wherein the PVP in the second cover layer had a lower Mw; sample No. 6 wherein the second cover layer had a lower PVP content; and sample No. 7 wherein the second cover layer had a smaller thickness. Sample No. 8 was prepared by the same procedure as sample No. 1 except that a single cover layer containing all the components of the first and second cover layers was formed to a thickness of 10 μm. Sample No. 8 had a surface roughness R20 substantially equal to sample No. 1.

On the surface of these samples, characters were written with a water-based ink pen. The water-based ink in the pen had the following composition.

| Ink composition | Parts |
|---|---|
| C.I. Direct Black 19 | 5 |
| Diethylene glycol | 30 |
| Water | 65 |

The printability and erasability of the written characters were examined as well as the adhesion of the cover layers. For sample Nos. 1, 2 and 4 to 7, the surface roughness R20 of the first cover layer was determined. The results are shown in Table 1.

(1) Printability

Each sample included 100 specimens, which were visually observed if their printed characters had such defects as blur, blot or repellence. The sample was rated "o", "Δ" and "X" according to the following criterion, and the type of defect was also reported in terms of blur, blot or repellence.

o: less than 5 specimens were defective

Δ: 5 to 30 specimens were defective

X: more than 30 specimens were defective (2) Erasability

Each sample included 100 specimens, which were wiped with wet fabric to examine whether or not the printed characters were erasable. The sample was rated "o", "Δ" and "X" according to the following criterion.

o: all specimens were erasable, and less than 5 specimens had obscure residue after erasing Δ: 5 to 30 specimens had perceivable residue after erasing X: not erasable (3) Adhesion of cover layers (3-1) Adhesion between upper protective coat and cover layer Each sample included 100 specimens. Scotch Clear Tape 600 (manufactured by 3M Co.) was attached to the cover layer over an adhesive area of 1.2 cm×1.0 cm and stripped therefrom. It was examined whether or not the cover layer was stripped. For those samples having both the first and second cover layers, the test was carried out after the first cover layer was formed.

(3-2) Adhesion between cover layers

For those samples having both the first and second cover layers, each including 100 specimens, adhesive tape was similarly attached to the second cover layer and stripped therefrom. It was examined whether or not the second cover layer was stripped.

The sample was rated "o", "Δ" and "X" according to the following criterion.

o: stripping occurred in less than 5 specimens

Δ: stripping occurred in 5 to 30 specimens

X: stripping occurred in more than 30 specimens

In Table 1, adhesion between upper protective coat and cover layer and adhesion between cover layers are referred to as adhesion 6-7 and 7-8, respectively, by picking up numerals from FIG. 1.

TABLE 1

| Sample No. | First cover layer | | | | Second cover layer | | | Print-ability | Eras-ability | Adhesion | | Remarks |
| | Filler | | $R_{20}$ (μm) | Thickness (μm) | PVP | | Thickness (μm) | | | 6-7 | 7-8 | |
| | Type | Mean particle size (μm) | | | Mw | Content (wt %) | | | | | | |
| 1 (invention) | $SiO_2$<br>$BaSO_4$<br>$Al_2O_3$ | 10<br>5<br>10 | 2.1 | 12 | 40000 | 90 | 5 | o | o | o | o | |
| 2 (comparison) | $SiO_2$<br>$BaSO_4$<br>$Al_2O_3$ | 10<br>5<br>10 | 2.5 | 15 | | none | | —<br>(not printable) | — | o | — | |
| 3 (comparison) | none | | | | 40000 | 90 | 5 | Δ<br>(slow drying) | o | X | — | low film strength, highly hygroscopic |
| 4 (comparison) | — | — | 0.3 | 10 | 40000 | 90 | 5 | Δ<br>(blot, repellence, slow drying) | o | o | X | |
| 5 (comparison) | $SiO_2$<br>$BaSO_4$<br>$Al_2O_3$ | 10<br>5<br>10 | 2.1 | 10 | 25000 | 90 | 5 | X<br>(blur, blot) | o | o | o | |
| 6 (comparison) | $SiO_2$<br>$BaSO_4$<br>$Al_2O_3$ | 10<br>5<br>10 | 2.1 | 10 | 40000 | 70 | 5 | o | X | o | o | |
| 7 (comparison) | $SiO_2$<br>$BaSO_4$<br>$Al_2O_3$ | 10<br>5<br>10 | 2.1 | 10 | 40000 | 90 | 0.03 | X<br>(blur, blot) | X | o | o | |
| 8 (comparison) | single cover layer containing the components of first and second cover layers of Sample No. 1, thickness 10 μm | | | | | | | o | X | o | — | |

It is evident form Table 1 that sample No. 1 within the scope of the invention is improved in printability, erasability and cover layer adhesion. Sample No. 1 had $R_{20}$ of about 2.1 μm at the second cover layer surface. In contrast, sample No. 4 whose first cover layer was free of the filler was inferior in printability because the second cover layer had a smooth surface ($R_{20}$=about 0.3 μm). Sample No. 5 using lower molecular weight PVP and sample No. 7 having a thin second cover layer were also inferior in printability. Sample No. 8 having a single cover layer having mixed all the components of the first and second cover layers of sample No. 1 was superior in printability because the top surface had $R_{20}$ equal to sample No. 1, but the printed characters could not be erased therefrom.

The effectiveness of the present invention is thus evident.

It was also found that sample No. 1 within the scope of the invention was effectively printable with oil-based ink using an oil-based ink pen.

For sample No. 1, CD signals were recorded by means of a CD-R recorder (RPD-1000 by Pioneer K.K.) and read out by means of a commercial compact disc player for counting C1 errors. The C1 error count met the CD standard. A block error rate (BLER) was also measured, with the result meeting the CD standard.

Example 2

Sample Nos. 11 and 16 were prepared by the same procedure as sample Nos. 1 and 6, respectively, except that polyurethane was used instead of the water-soluble nylon in the second cover layer.

These samples were examined as in Example 1. The results are shown in Table 2. The first cover layers of sample Nos. 11 and 16 had R20 equivalent to sample Nos. 1 and 6 of Example 1, respectively.

TABLE 2

| Sample No. | Print-ability | Eras-ability | Adhesion 6-7 | Adhesion 7-8 |
|---|---|---|---|---|
| 11 (invention) | ○ | ○ | ○ | ○ |
| 16 (comparison) | Δ (blur) | X | ○ | ○ |

The effectiveness of the invention is evident from Table 2. When a smaller proportion of PVP was combined with polyurethane, printability became low and the printed characters were not erasable.

It was also found that sample No. 11 was effectively printed with an oil-based ink pen. The results of C1 error and BLER were similar to those of sample No. 1, also satisfying the CD standard.

Example 3

Characters were printed on all the samples in Examples 1 and 2 using an ink jet recording system. The ink had the following composition.

| Ink composition | Parts |
|---|---|
| C.I. Direct Black 19 | 5 |
| Diethylene glycol | 30 |
| Water | 65 |

The thus printed samples were examined as in Example 1, finding equivalent results to the writing with a water-based ink pen.

Example 4

Sample Nos. 31 and 41 were prepared by the same procedure as sample No. 1 in Example 1 and No. 11 in Example 2, respectively, except that a single protective coat of 15 μm thick was formed instead of the upper and lower protective coats.

These samples were examined for printability, erasability and cover layer adhesion, finding equivalent results to the corresponding samples. The results of C1 error and BLER satisfied the CD standard, but were somewhat inferior to those of sample Nos. 1 and 11.

There has been described an optical disc having a filled cover layer and an overlying PVP cover layer which printable with water-based ink to form characters and images of high quality and definition. Characters and images of water-based ink are erasable and thus simply correctable.

Japanese Patent Application No. 240625/1994 is incorporated hereinby reference.

Although some preferred embodiments have been described, many modifications and variations may be made thereto in the light of the above teachings. It is therefore to be understood that within the scope of the appended claims, the invention may be practiced otherwise than as specifically described.

I claim:

1. An optical disc comprising an optical disc body, a protective coat on the disc body, a first cover layer on the protective coat comprising a filler and a binder, and a second cover layer on the first cover layer comprising at least 80% by weight of vinyl pyrrolidone polymer having a weight average molecular weight Mw of at least 30,000, said second cover layer having a thickness of at least 0.1 μm and being printable with water-based ink.

2. The optical disc of claim 1 wherein said first cover layer has a surface roughness R20 of at least 1.0 μm.

3. The optical disc of claim 1 wherein said filler is particulate and has a mean particle size of 0.1 to 50 μm.

4. The optical disc of claim 1 wherein said filler is an inorganic fine particulate filler and said binder is a cured one of a radiation-curable compound.

5. The optical disc of claim 4 wherein said fine particulate filler is at least one member selected from the group consisting of silica, alumina, and barium salts.

6. The optical disc of claim 4 wherein said radiation-curable compound has been cured by UV exposure.

7. The optical disc of claim 1 wherein said first cover layer has a thickness of at least 3 μm.

8. The optical disc of claim 1 wherein said protective coat is formed of a radiation-cured resin.

9. The optical disc of claim 1 wherein said protective coat includes at least two layers.

* * * * *